United States Patent
Abbott et al.

(10) Patent No.: US 9,699,631 B2
(45) Date of Patent: Jul. 4, 2017

(54) PREVENTING ACCESS OF CALLS TO UNAUTHORIZED USERS AND AUTOMATING CALL TRANSFERS

(71) Applicant: Verizon Patent and Licensing Inc., Arlington, VA (US)

(72) Inventors: Martin J. Abbott, Flemington, NJ (US); Jonathan R. LoPorto, Millstone Township, NJ (US); So Young Park, Englewood Cliffs, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 14/705,284

(22) Filed: May 6, 2015

(65) Prior Publication Data

US 2016/0330600 A1  Nov. 10, 2016

(51) Int. Cl.
  *H04M 3/42* (2006.01)
  *H04W 4/16* (2009.01)
  *H04M 3/54* (2006.01)
  *H04W 4/00* (2009.01)

(52) U.S. Cl.
  CPC ............ *H04W 4/16* (2013.01); *H04M 3/543* (2013.01); *H04W 4/008* (2013.01); *H04M 2203/1091* (2013.01); *H04M 2203/2094* (2013.01)

(58) Field of Classification Search
  CPC ....... H04W 4/16; H04W 4/008; H04W 12/06; H04W 60/00; H04W 80/04; H04W 88/182; H04W 8/06; H04W 88/02; H04W 12/08; H04W 24/02; H04W 36/0038; H04W 4/001; H04W 4/24; H04W 4/26; H04W 88/04; H04W 8/18; H04W 92/18; H04M 3/543
  USPC .......... 455/417, 74, 74.1, 127.4, 414.1, 420, 455/421, 422.1, 552.1, 560, 567, 455/41.1–41.2, 456.1; 379/211.01, 379/211.02, 211.03, 212.01
  See application file for complete search history.

(56) References Cited

U.S. PATENT DOCUMENTS

| | | | |
|---|---|---|---|
| 6,253,088 B1 * | 6/2001 | Wenk | H04M 1/725 455/417 |
| 7,885,645 B2 * | 2/2011 | Postma | G06F 1/1616 379/211.01 |
| 8,165,572 B1 * | 4/2012 | Kirchhoff | H04M 3/42263 379/142.07 |
| 8,224,307 B2 * | 7/2012 | Ray | H04W 36/30 370/352 |
| 8,520,827 B1 * | 8/2013 | Fuoss | H04W 4/16 379/212.01 |
| 9,100,982 B1 * | 8/2015 | Shipley | H04W 80/04 |
| 2006/0223511 A1 * | 10/2006 | Hagale | H04M 3/54 455/417 |
| 2007/0086446 A1 * | 4/2007 | Denny | H04M 3/20 370/356 |

(Continued)

Primary Examiner — Babar Sarwar

(57) ABSTRACT

A first device may be unable to access a line hosting a call that has been placed on hold by a second device when the first device and second device are located remotely from each other. A server device may manage the status of the line to prevent the first device from accessing the line when the line is currently in control by the second device. When the first device and second device communicate via NFC, the line may be automatically released, so that the control of the line and of the call may be automatically transferred to the first device.

18 Claims, 12 Drawing Sheets

(56) References Cited

U.S. PATENT DOCUMENTS

| | | | |
|---|---|---|---|
| 2008/0292074 A1* | 11/2008 | Boni | H04M 3/54 379/93.11 |
| 2013/0115932 A1* | 5/2013 | Williams | H04M 3/58 455/417 |
| 2014/0155033 A1* | 6/2014 | Lazaridus | H04M 1/6091 455/411 |
| 2015/0163295 A1* | 6/2015 | Shmilov | H04M 3/58 370/271 |
| 2016/0183276 A1* | 6/2016 | Marinier | H04W 72/02 370/329 |

* cited by examiner

US 9,699,631 B2

PREVENTING ACCESS OF CALLS TO UNAUTHORIZED USERS AND AUTOMATING CALL TRANSFERS

BACKGROUND

In a Voice over Long Term Evolution (VoLTE) environment, multiple different devices may be associated with a single telephone number. This permits the different devices to place and/or receive telephone calls associated with the same telephone number, and to transfer calls from one device to the other. Also, a call that is placed on hold by a first device (whereby audio is not transmitted between either party in the call) may be accessed by a second device associated with the same telephone number.

Further in a VoLTE environment, a single telephone number may be associated with multiple lines, where each line may host a telephone call. Multiple calls may be taking place simultaneously via respective lines associated with the telephone number. For example, one call may be "active" (e.g., where audio is transmitted between parties in the call), whereas another call may be on hold (e.g., where audio is not transmitted between the parties). Additionally, or alternatively, multiple telephone calls may be merged, or "conferenced in," whereby the multiple telephone calls are "active."

DETAILED DESCRIPTION OF THE PREFERRED EMBODIMENTS

The following detailed description refers to the accompanying drawings. The same reference numbers in different drawings may identify the same or similar elements.

While the ability to access telephone calls between devices associated with the same telephone number may add a level of convenience, this ability may also pose a security concern. For example, if a user places a call on hold from the user's mobile phone, an unauthorized user may access the call from a fixed station located remotely from the mobile phone. Thus, even if the user of the mobile phone is located several miles away from the fixed station, an unauthorized user may access the call from the fixed station, potentially without the knowledge or permission of the user of the mobile phone.

Also, the act of transferring calls from one device to another may be cumbersome, time consuming, and prone to user errors (e.g., accidently hanging up a call, accidently merging multiple calls, etc.). For example, in order to transfer even a single telephone call (e.g., from a mobile phone to a desktop phone), the user must typically select various commands on each of the mobile phone and the desktop phone. Transferring multiple telephone calls is even more time consuming and error prone.

System and/or methods, described herein, may automatically transfer a call when two devices (Associated with the same telephone number) come into close proximity of each other (e.g., when the two devices communicate via NFC). This may reduce or eliminate the need for the user to manually interact with the devices in order to transfer the telephone call, thereby reducing time when transferring the call, and eliminating the chance for user errors. Further, multiple calls may be quickly and easily transferred, simply by tapping one device to another.

Systems and/or methods, described herein, may furthermore prevent a telephone call, placed on hold by a first device, from being accessed by a second device when the first device and second device are not within close proximity of each other. This may prevent an unauthorized user from accessing the call from the second device. For example, the second device may be prevented from accessing the call, until the second device is placed within close proximity of the first device (e.g., when the first device and second device communicate via Near Field Communication ("NFC") techniques).

Once the second device is within close proximity of the first device (e.g., when the two devices make physical contact, such that two device communicate via NFC), control of the call may be transferred to the second device. As a result, unauthorized users are unable to access the call since the call may only be transferred when the two devices are within close proximity of each other.

Figure 1A:
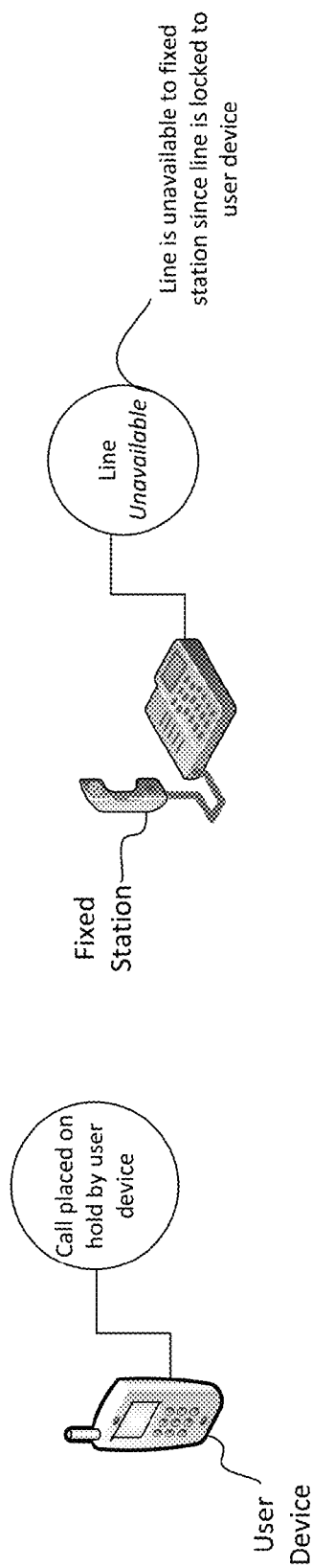
FIGS. 1A and 1B illustrate an example overview of an implementation described herein.
Figure 1B:
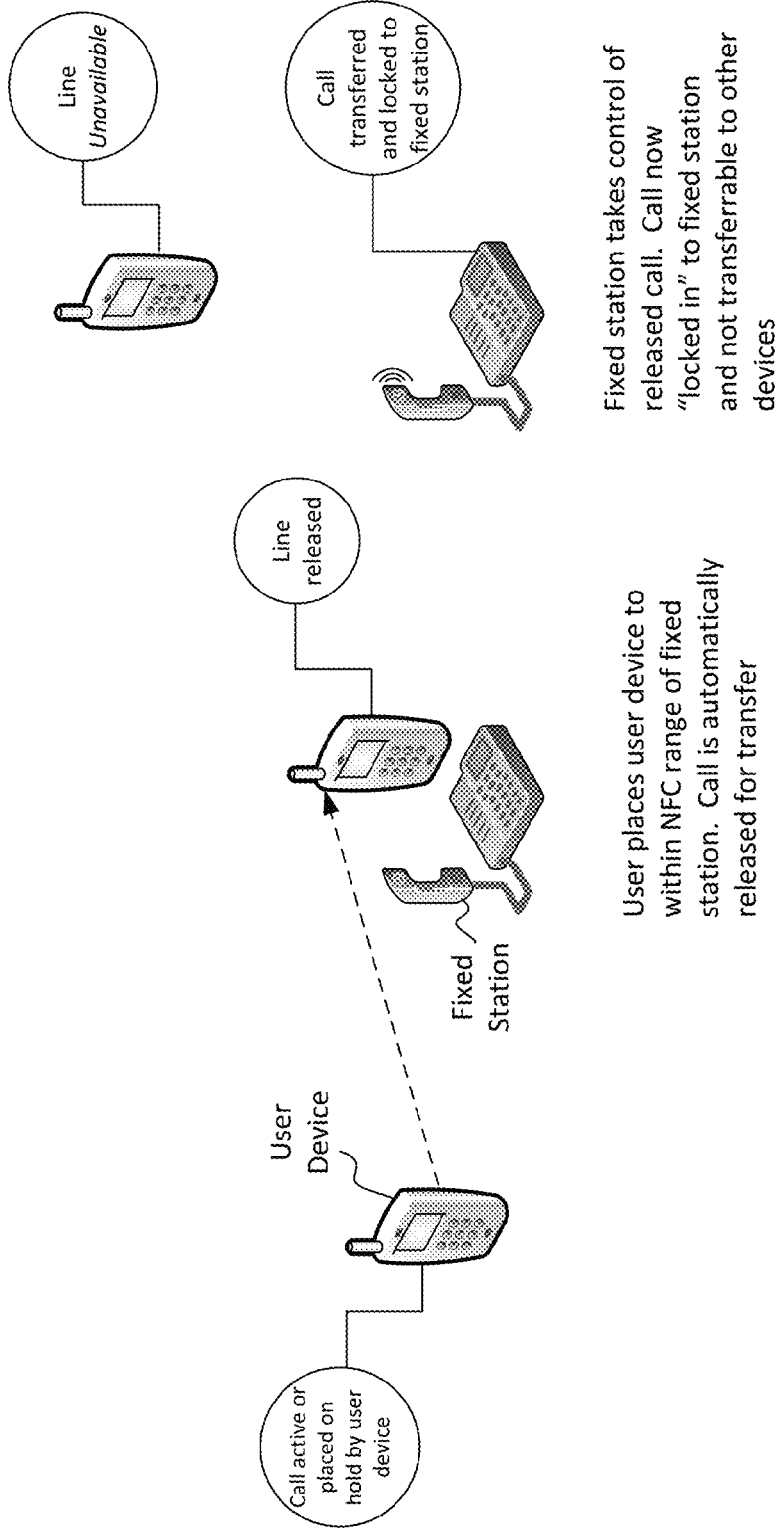

FIGS. 1A and 1B illustrate an example overview of an implementation described herein. In FIGS. 1A-1B, assume that a user device and a fixed station are associated with the same telephone number. In FIG. 1A, assume that the user device and the fixed station are substantially remote from each other. As shown in FIG. 1A, a user of the user device (e.g., a mobile phone), may place a call on hold. When the call is placed on hold, and in accordance with some implementations, a line hosting the call on hold is inaccessible by the fixed station (e.g., as indicated by "Line unavailable" in FIG. 1A). As a result, an unauthorized user is unable to access the call on hold when the user device and fixed station are located remotely from each other.

Referring to FIG. 1B, assume that a call is either active (where audio is transmitted between parties in the call), or placed on hold by a user of the user device. Given this assumption, the line hosting the call is inaccessible to the fixed station. When the user device is later placed within a close proximity of the fixed station (e.g., when the user device is physically tapped to the fixed station), the user device may automatically, without user interaction, "release" the line hosting the call so that control of the line may be transferred to the fixed station, thus permitting the fixed station to access the call. The fixed station then automatically, without user interaction, may take control of the released line. For example, when the user device is physically tapped to the fixed station, the user device and the fixed station may communicate via NFC, which then causes the user device to release the line, and the fixed station to take control of the released line (e.g., the call can be transferred to the fixed station).

Once control of the line has been transferred, the line is now "locked in" to the fixed station and is inaccessible to the user device. If the call had been previously active on the user device, the call may be active on the fixed station, and inaccessible to the user device. If the call had previously been on hold with the user device, the call may be on hold and available to be "picked up" by the fixed station, and is inaccessible to the user device. Also, if multiple lines, each hosting respective calls, were previously being controlled by the user device, those lines may be now be controlled by the fixed station, and inaccessible by the user device. In some implementations, once a device has had control of the line (e.g., if a call is initially placed on, or answered by, the device and then transferred to another device), the device may be able to join the call and/or have the call transferred to the device without needing to make contact with the other device.

As a result, unauthorized users are unable to access a call since control of a line hosting the call may only be transferred when the user device and fixed station are within close proximity of each other (e.g., within NFC communications range). Furthermore, calls may be quickly and conveniently transferred (e.g., by transferring control of lines hosting the calls) simply by placing the user device within NFC communications range of the fixed station (e.g., tapping the user device to the fixed station). As an example, if a user was on a call using a mobile phone, the user may quickly transfer the call to their desk phone when the user arrives at their home or office in which the desk phone is located. Similarly, if the user is on a call on their desk phone, the user may quickly transfer the call to their mobile phone to continue the call when the user leaves the location of their desk phone.

Figure 2:
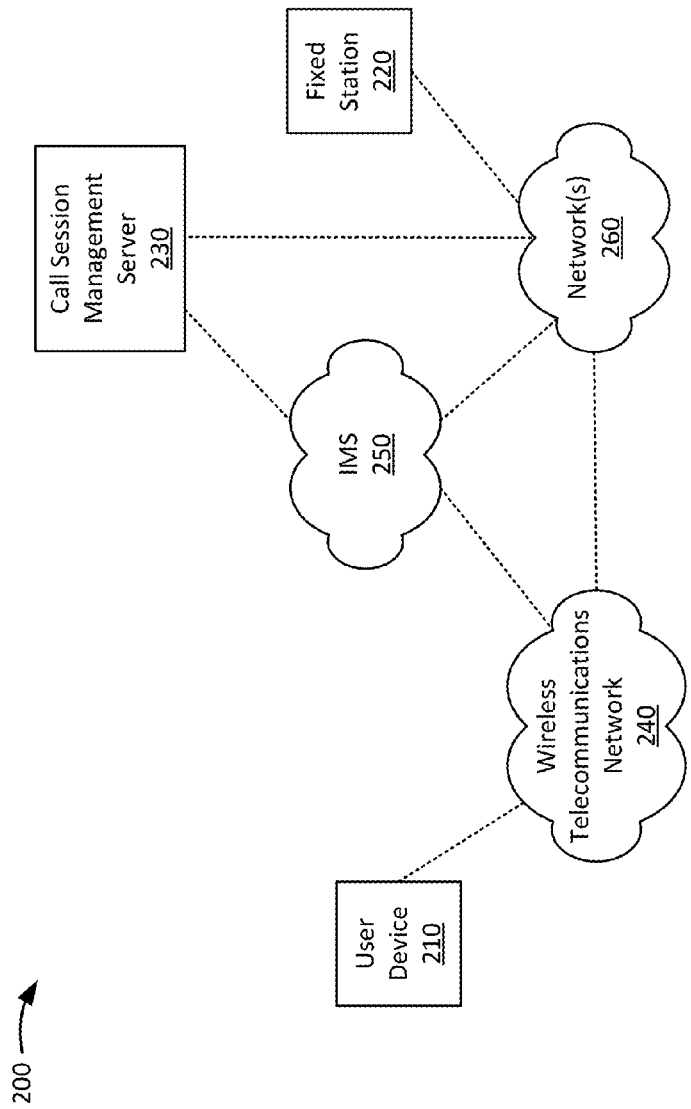
FIG. 2 is a diagram of an example environment 200 in which systems and/or methods described herein may be implemented.

FIG. 2 is a diagram of an example environment 200 in which systems and/or methods described herein may be implemented. As shown in FIG. 2, environment 200 may include user device 210, fixed station 220, call session management server 230, wireless telecommunications network 240, internet protocol ("IP") multimedia subsystem (IMS) 250, and one or more networks 260.

User device 210 may include a computation or communication device, such as a wireless mobile communication device that is capable of communicating with a network, such as wireless telecommunications network 240. For example, user device 210 may include a radiotelephone, a personal communications system ("PCS") terminal (e.g., that may combine a cellular radiotelephone with data processing and data communications capabilities), a personal digital assistant ("PDA") (e.g., that may include a radiotelephone, a pager, Internet/intranet access, etc.), a smart phone, a laptop computer, a tablet computer, or another type of computation or communication device. User device 210 may send data to and/or receive data from network wireless telecommunications network 240. In some implementations, user device 210 may also communicate directly with network 260 (e.g., via a WiFi network).

Fixed station 220 may include a computation or communication device that is capable of communicating with a network, such as network 260. For example, fixed station 220 may include a desktop telephone, a desktop computer, or the like. Fixed station 220 may access call session management server 230 via network 260 to place and/or receive telephone calls. In some implementations, fixed station 220 may include a voice over Internet protocol IP ("VoIP") telephone.

In some implementations, user device 210 and/or fixed station 220 may communicate with call session management server 230 using account credentials (e.g., username, password, Subscriber Identity Module (SIM) card information, etc.) that are associated with a particular telephone number. Multiple devices may use account credentials associated with the same particular telephone number in order to place/receive calls using the particular telephone number, and/or transfer control of a call from one device to the other. Also, user device 210 and/or fixed station 220 may receive line status information from call session management server 230 in real time (or near real time). In some implementations, user device 210 and/or fixed station 220 may display the line status information. As described in greater detail below with respect to FIG. 3, the line status may indicate whether a line, associated with a particular telephone number, is active, on hold, locked, released, or available.

Call session management server 230 may include one or more computing devices that may establish call sessions for user device 210 and/or fixed station 220. In some implementations, call session management server 230 may include, communicate with, perform functions of, and/or be incorporated within a call server control function ("CSCF") server. Call session management server 230 may receive, store, and output line status information for lines associated with a telephone number. For example, call session management server 230 may store information identifying that a particular line of a particular telephone number is in control by a particular device, and may output line status information to devices associated with the particular telephone number (e.g., devices that communicate with call session management server 230 using account credentials associated with the particular telephone number).

Call session management server 230 may act as a "gatekeeper" for a line associated with a telephone number. For example, call session management server 230 may process requests made by user device 210 and/or fixed station 220 to access a line in order to place or receive a telephone call. Call session management server 230 may also process a request to transfer a call that is currently active or on hold. In some implementations, call session management server 230 may aid in preventing one user device 210 or fixed station 220 from accessing a call (e.g., picking up or transferring the call) when the line is locked (e.g., controlled by another user device 210 or fixed station 220). Call session management server 230 may permit a user device 210 or fixed station 220 to take control of a line when the line is in a "released" state. Once control of the line has been taken, the line status may be updated to a "locked" state, so that other devices are unable to access the line.

Wireless telecommunications network 240 may include one or more network devices that receive, process, and/or transmit traffic, such as audio, video, text, and/or other data, destined for and/or received from user device 210. For example, wireless telecommunications network 240 may include a base station, a Serving Gateway ("SGW"), a Mobility Management Entity ("MME"), and/or packet data network gateway ("PGW"). Components of wireless telecommunications network 240 may implemented as a Long-Term Evolution ("LTE") network, and may include an eNodeB ("eNB") device. Additionally, or alternatively, wireless telecommunications network 240 may include a Code Division Multiple Access ("CDMA") 2000 1× network, a third generation ("3G") network, a fifth generation ("5G") network, and/or other type of wireless network. Wireless telecommunications network 240 may receive traffic from and/or send traffic to network 260.

IMS 250 may include one or more devices, such as a CSCF and/or Home Subscriber Server/Authentication, Authorization, and Accounting ("HSS/AAA") server. In some implementations, wireless telecommunications network 240 and/or IMS 250 may operate based on one or more third generation partnership project ("3GPP") wireless communication standards.

Network 260 may include one or more wired and/or wireless networks. Network 260 may include one or more packet data networks PDNs. For example, network 260 may include a local area network ("LAN"), wireless LAN ("WLAN"), a wide area network ("WAN"), a metropolitan network ("MAN"), an ad hoc network, a managed Internet Protocol ("IP") network, a virtual private network ("VPN"), an intranet, the Internet, a fiber optic-based network, and/or a combination of these or other types of networks. Also, network 260 may include one or more circuit switched networks (e.g., the public switched telephone network ("PSTN").

The quantity of devices and/or networks in environment 200 is not limited to what is shown in FIG. 2. In practice, environment 200 may include additional devices and/or networks; fewer devices and/or networks; different devices and/or networks; or differently arranged devices and/or networks than illustrated in FIG. 2. Also, in some implementations, one or more of the devices of environment 200 may perform one or more functions described as being performed by another one or more of the devices of environment 200. Devices of environment 200 may interconnect via wired connections, wireless connections, or a combination of wired and wireless connections.

Figure 3:
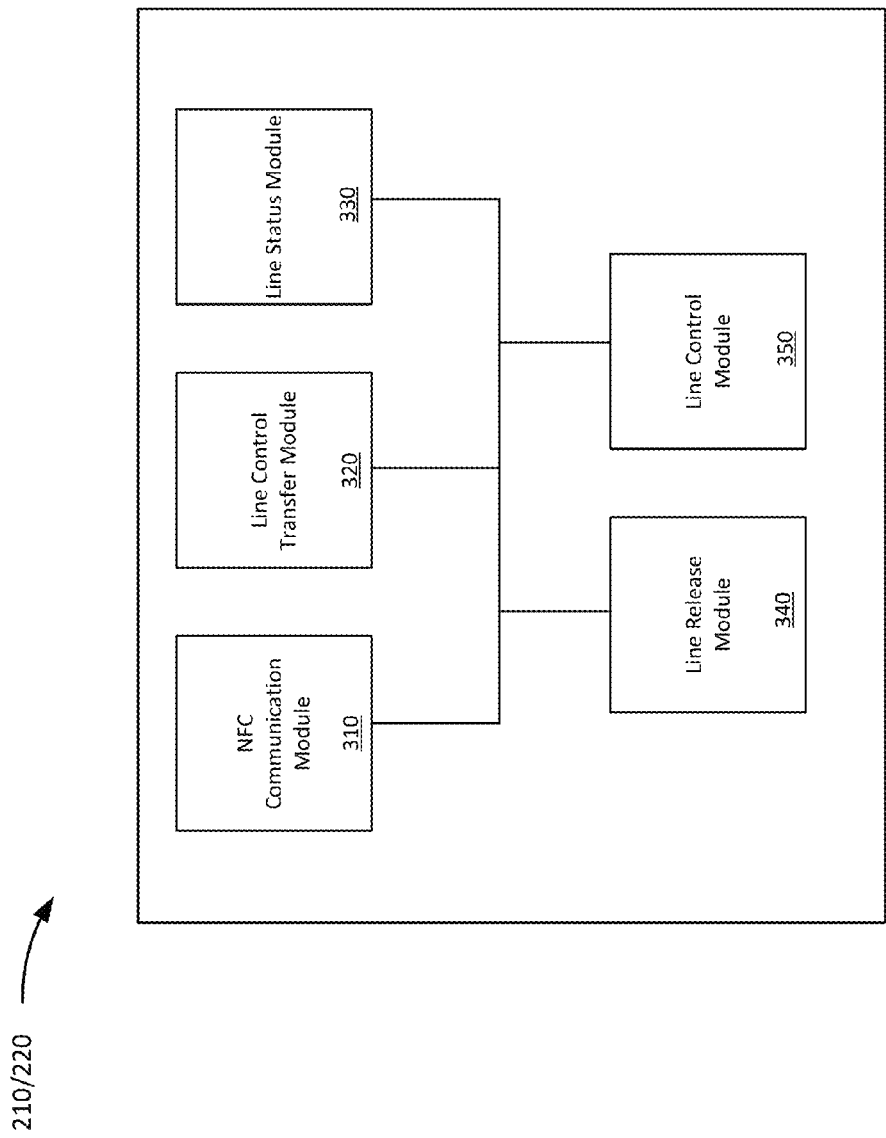
FIG. 3 illustrates example functional components of a user device and/or a fixed station.

FIG. 3 illustrates example functional components of a user device and/or a fixed station. In some other implementations, FIG. 3 may include functional components implemented by one or more devices, which include or exclude user device 210 and/or fixed station 220. As shown in FIG. 3, user device 210 and/or fixed station 220 may include NFC communication module 310, line control transfer module 320, line status module 330, line release module 340, and/or line control module 350.

NFC communication module 310 may communicate with other devices via NFC communication techniques. For example, NFC communication module 310 may output a message (e.g., in the NFC Data Exchange Format ("NDEF")) to another NFC supported device when the two devices enter NFC communications range (e.g., when the two devices make physical contact with each other). The NDEF messages may include an identifier of the device and information identifying an application running on the device. NFC communication module 310 may be used, for example, to detect when user device 210 and fixed station 220 come into contact or close proximity of each other.

Line control transfer module 320 may include a tag dispatch system to read and process NDEF messages outputted by another device. For example, line control transfer module 320 may execute set of instructions to transfer control of a telephone call based on a device identifier included in an NDEF message from another device. As an example, assume that user device 210 and fixed station 220 are associated with the same telephone number. Line control transfer module 320 (associated with user device 210) may execute a set of instructions to transfer control of a telephone call (e.g., transfer control of a line hosting the call) when line control transfer module 320 receives an NDEF message with an identifier of fixed station 220. Similarly, line control transfer module 320 (associated with fixed station 220) may execute a set of instructions to transfer control of a telephone call when line control transfer module 320 receives an NDEF message with the identifier of user device 210. In other words, line control transfer module 320 may execute a set of instructions to transfer control of a telephone call when user device 210 and fixed station 220 discover each other via NFC communication.

In some implementations, line control transfer module 320 may transfer control of a telephone call by directing line release module 340 to release control of a line when the device of line control transfer module 320 controls the line, and when line control transfer module 320 of user device 210 discovers fixed station 220 (or when line control transfer module 320 of fixed station 220 discovers user device 210). Additionally, or alternatively, line control transfer module 320 may direct line control module 350 to take control of a line when the device of line control transfer module 320 is not in control of the line, and when line control transfer module 320 of user device 210 discovers fixed station 220 (or when line control transfer module 320 of fixed station 220 discovers user device 210). In some implementations, line control transfer module 320 may invoke line release module 340 and/or line control module 350 after a delay, which may be implemented to permit a user of user device 210 and/or fixed station 220 to cancel the transfer of control of a line in the event that user device 210 is inadvertently placed within NFC range of fixed station 220.

Line status module 330 may receive call status information from call session management server 230. In some implementations, line status module 330 may periodically or intermittently communicate with call session management server 230 in order to receive line status information from call session management server 230. For example, line status module 330 may query call session management server 230 for the line status information, and/or call session management server 230 may push the line status information to line status module 330.

The line status information may identify the status of one or more lines associated with a telephone number associated with user device 210 and/or fixed station 220. For example, the line status information may include the following example statuses:

"Active, controlled": the line is controlled by the device of line status module 330, is hosting a call that is not on hold, and is not available to other devices.

"Active, locked": the line is not controlled by the device of line status module 330, is hosting a call that is not on hold, and is not available to the device of line status module 330.

"Active, released": the line is hosting a call that is not on hold, is not controlled by any devices, and is available for transfer.

"Hold, controlled" the line is controlled by the device of line status module 330, is hosting a call that is on hold, and is not available to other devices.

"Hold, locked": the line is not controlled by the device of line status module 330, is hosting a call that is on hold, and is not available to the device of line status module 330.

"Hold, released": the line is hosting a call that is on hold, is not controlled by any devices, and is available for transfer.

"Available": the line is not hosting any calls, and is available for use by any devices.

Line release module 340 may release a line that is currently being controlled, so that another device may take control of the line. For example, line release module 340 may release the when line control transfer module 320 determines that control of the line should be released (e.g., when NFC communication module 310 receives an NDEF message from a device associated with the device of line release module 340, and when the device of line release module 340 is controlled by the line). In some implementations, line release module 340 may release the line by outputting a message to call session management server 230 indicating that the line has been released, and is available to be controlled by another device. When the line is released, the line may continue to host the call, but the line is no longer controlled by the device of line release module 340 so that another device, associated with the telephone number of the line, may take control of the line and of the call. Call session management server 230 may receive an indication that the line has been released, and may output this indication to other devices associated with the telephone number of the released line.

Line control module 350 may take control of a line (and of a call hosted by the line) that has been released by an associated device. For example, line control module 350 may take control of the line when line control transfer module 320 determines that control of the line should be taken (e.g., when NFC communication module 310 receives an NDEF message from a device associated with the device of line release module 340). In some implementations, line control module 350 may take control of the line by requesting call session management server 230 to establish a call session for a call hosted by the line (e.g., to transfer an active or an on-hold call). Once the session has been established, the line is now controlled by the device of line control module 350.

Figure 4:
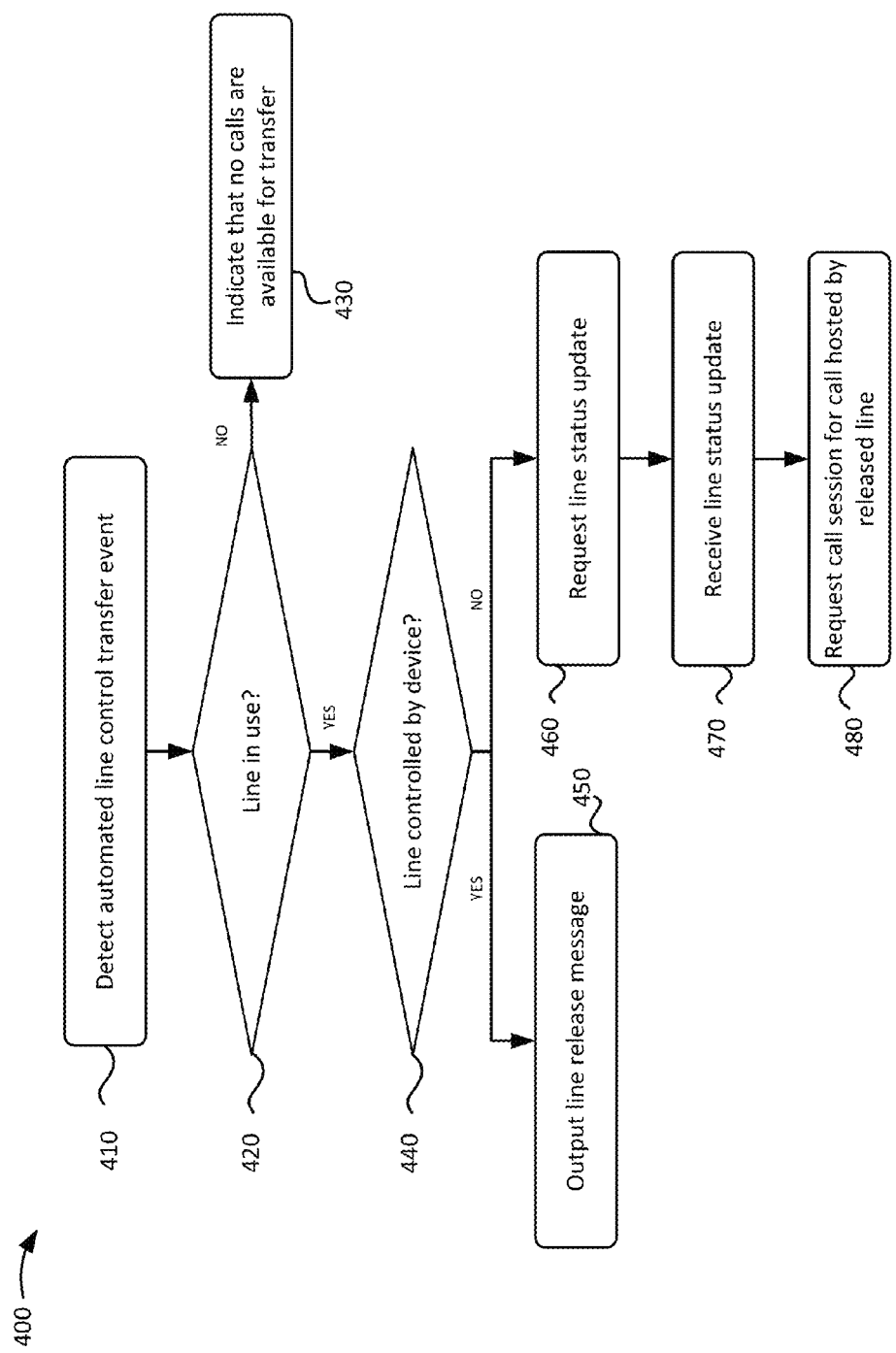
FIG. 4 illustrates a flowchart of an example process for automatically transferring control of a line, and of calls hosted by the line.

FIG. 4 illustrates a flowchart of an example process 400 for automatically transferring control of a line, and of calls hosted by the line. In some implementations, process 400 may be performed by user device 210 and/or fixed station 220. In some implementations, some or all of blocks of process 400 may be performed by one or more other devices.

As shown in FIG. 4, process 400 may include detecting an automated line control transfer event (block 410). For example, user device 210 and/or fixed station 220 may detect an automated line control transfer event. As described above with respect to line control transfer module 320, user device 210 and/or fixed station 220 may detect an automated line control transfer event when user device 210 and fixed station 220 are moved to within NFC range of each other, and when user device 210 and fixed station 220 discover each other via NFC (e.g., when user device 210 is physically touched to fixed station 220). For example, when user device 210 is placed within NFC range of fixed station 220, user device 210 may send an NDEF message containing an identifier of user device 210, and fixed station 220 may send an NDEF message containing an identifier of fixed station 220.

Additionally, or alternatively, the NDEF message sent by each of user device 210 and fixed station 220 may include a telephone number associated with user device 210 and fixed station 220. If the telephone numbers match, user device 210 and fixed station 220 may each detect the automated line control transfer event. Additionally, or alternatively, the NDEF message may include accounted credentials, a key, and/or other information that may indicate an automated line control transfer event.

In some implementations, user device 210 and/or fixed station 220 may display a countdown based on detecting the automated line control transfer event. The countdown may be a few seconds, and may permit the user to cancel the automated line control transfer event (e.g., in the event that user device 210 and fixed station 220 were inadvertently placed within NFC range of each other). In some implementations, user device 210 and/or fixed station 220 may display a message and/or play an audio message, and may require confirmation before transferring control of a line. In some implementations, control may be transferred automatically unless the user cancels the transfer.

Process 400 may also include determining whether a line is in use (block 420). For example, user device 210 and/or fixed station 220 may determine whether any lines are in use based on detecting the automated line control transfer event (at block 410). In some implementations, the line status information may be received from call session management server 230. A line may be considered to be "in use" or "occupied" when the line is hosting a call (regardless of whether the call is active or on hold). In some implementations, user device 210 and/or fixed station 220 may request the line status information, and/or the line status information may have been previously pushed by call session management server 230.

If no lines are in use (block 420—NO), process 400 may include indicating that no calls are available for transfer (block 430). For example, user device 210 and/or fixed station 220 may indicate that no calls are available for transfer. In some implementations, user device 210 and/or fixed station 220 may display an error message that no calls are available for transfer. Additionally, or alternatively, user device 210 and/or fixed station 220 may, in some other manner, indicate that no calls are available for transfer, or may simply do nothing.

If a line is in use (block 420—YES), process 400 may include determining whether the line is controlled by the device (block 440). For example, user device 210 and/or fixed station 220 may determine whether they control the line based on the line status information.

If, for example, the line is in control by the device (block 440—YES), process 400 may include outputting a line release message (block 450). For example, user device 210 and/or fixed station 220 may output a line release message to call session management server 230. The line release message indicates, to call session management server 230, that the line may be controlled by another user device 210 and/or fixed station 220. Based on receiving the message, call session management server 230 may update the line status indicating that the line has been released. The other user device 210 or fixed station 220 may now be able to take control of the line, and the when control of the line has been taken by user device 210 or fixed station 220, call session management server 230 may update the line status indicating that the line is now locked.

If, on the other hand, the line is not controlled by the device (block 440—NO), process 400 may include requesting a line status update (block 460). For example, user device 210 or fixed station 220 may request a line status update from call session management server 230. In some implementations, user device 210 or fixed station 220 may receive the line status update without requesting the line status update (e.g., when call session management server 230 pushes the line status update to user device 210 and or fixed station 220).

Process 400 may further include receiving the line status update (block 470). For example, user device 210 or fixed station 220 may receive the line status update from call session management server 230, after the other user device 210 or fixed station 220 outputs the line release message to call session management server 230. In this example, the line status update may indicate that the line has been released.

Process 400 may further include requesting a call session for a call hosted by the released line (block 480). For example, user device 210 or fixed station 220 may request, via call session management server 230, a call session for the call hosted by the released line. Call session management server 230 may process the request by confirming that the line is in a "released" state, establishing the session (e.g., transferring the call), and then updating the line status to the "locked" state. In some implementations, the call session may be established for user device 210 and/or fixed station 220 without user device 210 and/or fixed station 220 needing to request the call session. For example, call session management server 230 may facilitate establishment of the call session 230 based on receiving the release message.

Figure 5:
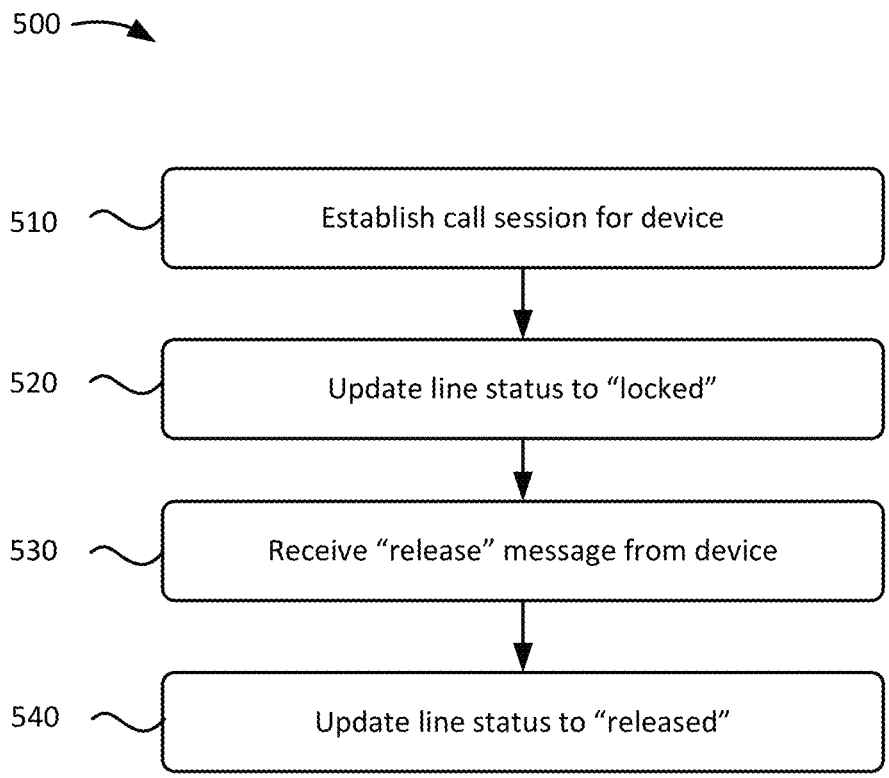
FIG. 5 illustrates a flowchart of an example process for updating line status information.

FIG. 5 illustrates a flowchart of an example process 500 for updating line status information. In some implementations, process 500 may be performed by call session management server 230. In some implementations, some or all of blocks of process 500 may be performed by one or more other devices.

As shown in FIG. 5, process 500 may include establishing a call session for a device (block 510). For example, call session management server 230 may establish a call session for user device 210 or fixed station 220 when a user of user device 210 or call session management server 230 places a call via an available line. In some implementations, call session management server 230 may facilitate establishment of the call session. For example, call session management server 230 may communicate with a CSCF, which may establish the call session.

Process 500 may further include updating the line status to "locked" (block 520). For example, call session management server 230 may update the line status to "locked" based on establishing the call session for the device. In some implementations, call session management server 230 may store information indicating that the line is locked, and is inaccessible by other devices associated with the telephone number of the line. In some implementations, call session management server 230 may output the line status to devices associated with the telephone number of the line. The "locked" status may correspond to, for example, the "hold, locked" status or the "active, locked" status. Also, a line status of "locked" may also be associated with a particular device. For example, call session management server 230 may store information indicating that the line is "locked" to particular user device 210 or fixed station 220 so that only the particular user device 210 or fixed station 220 may access the line.

Process 500 may also include receiving a "release" message from the device (block 530). For example, call session management server 230 may receive the "release" message from the device with the established call session (e.g., user device 210 or fixed station 220) when the device outputs the "release" message. The device may output the message based on detecting a line transfer event (e.g., when user device 210 and fixed station 220 make physical contact with each other, and/or when user device 210 and fixed station 220 discover each other via NFC or by some other technique). In some implementations, call session management server 230 may authenticate that the release message has been received from user device 210 or fixed station 220 via any number of authentication techniques.

Process 500 may further include updating the line status to "released." For example, call session management server 230 may update the line status to "released" based on receiving the release message from user device 210 or fixed station 220 (e.g., the same user device 210 or fixed station 220 to which the line was locked). In some implementations, call session management server 230 may store information indicating that the line is released, so that another device may access the line, and take control of the line. The "released" status may correspond to, for example, the "hold, released" status, or the "active, released" status.

Figure 6:
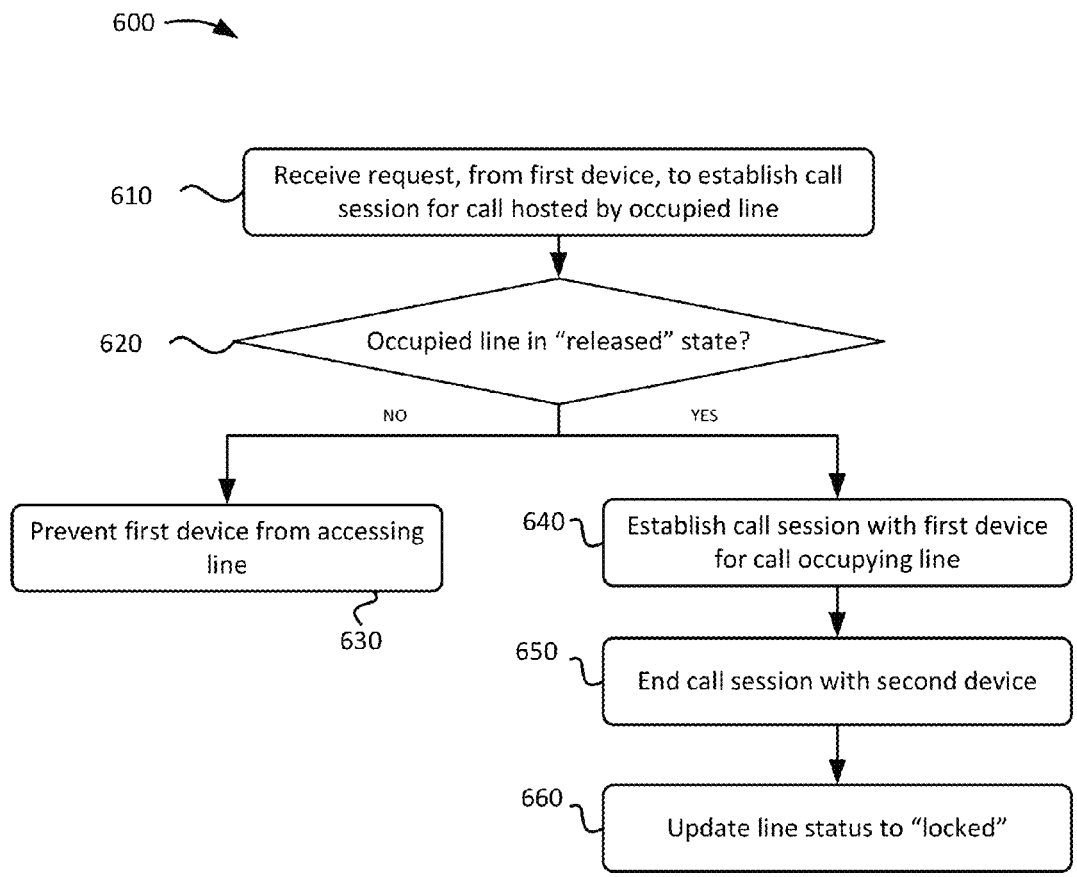
FIG. 6 illustrates a flowchart of an example process for facilitating the transfer of control of a line from one device to another.

FIG. 6 illustrates a flowchart of an example process 600 for facilitating the transfer of control of a line from one device to another. In some implementations, process 600 may be performed by call session management server 230. In some implementations, some or all of blocks of process 600 may be performed by one or more other devices. In some implementations, process 600 may be performed subsequent to process 500.

As shown in FIG. 6, process 600 may include receiving a request, from a first device, to establish a call session for a call hosted by an occupied line (block 610). For example, call session management server 230 may receive a request from a first device (e.g., user device 210 or fixed station 220) to establish a call session for an occupied line (e.g., a line that is currently in use by a second device). Call session management server 230 may receive the request from the first device in order for a call, currently occupying the line, to be transferred to the first device from the second device. The first device may output the request when the first device and second device discover each other via NFC (e.g., when the first device and second device come in to physical contact with each other). The occupied line may be hosting a call that is currently active or on hold.

Process 600 may further include determining whether the occupied line is in a "released" state (block 620). For example, call session management server 230 may determine whether the occupied line is in the "released" state. The occupied line may be in the released state when call session management server 230 has received a release message from the second device. As described above, the second device may output the release message when the first device and second device have discovered each other via NFC.

If, for example, call session management server 230 determines that the occupied line is not in the "released" state (block 620—NO), process 600 may include preventing the first device from accessing the line (block 630). For example, call session management server 230 may prevent the first device from accessing the line (e.g., by denying the request to establish the call session), and may not establish a call session. In some implementations, call session management server 230 may prevent the first device from accessing the line in a situation where a user manually interacts with the first device to access the call hosted by the occupied line, and when the first device and second device have not discovered each other via NFC (e.g., when the first device and second device are substantially remote from each other). Call session management server 230 may prevent the first device from accessing the line, thereby preventing an unauthorized user from accessing the line when the first device and second device are substantially remote from each other.

If, on the other hand, call session management server 230 determines that the occupied line is in the "released" state (block 620—YES), process 600 may include establishing a call session with the first device for the call occupying the line (block 640). For example, call session management server 230 may establish the call session for the second user device. In some implementations, call session management server 230 may interact with a CSCF server to establish the call session.

Process 600 may further include ending the call session with the second device (block 650). For example, call session management server 230 may end the call session with the second device so that only the first device has an established call session for the call. In some implementations, call session management server 230 may interact with a CSCF server to end the call session.

Process 600 may also include updating the line status to "locked" (block 660). For example, call session management server 230 may update the line status to "locked" in order to prevent another device from accessing the line.

Figure 7:
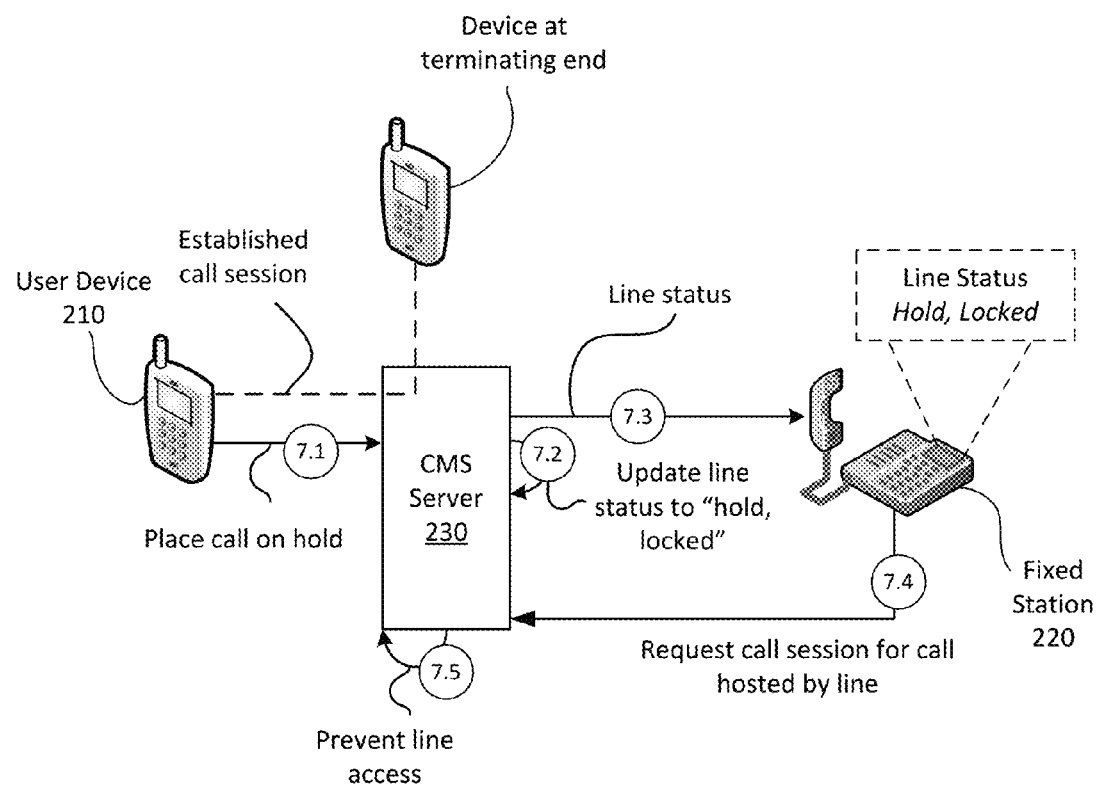
FIG. 7 illustrates an example implementation for preventing a fixed station from accessing a call, placed on hold by a user device, when the fixed station and user device are substantially remote from each other.

FIG. 7 illustrates an example implementation for preventing a fixed station from accessing a call, placed on hold by a user device, when the fixed station and user device are substantially remote from each other. In FIG. 7, assume that user device 210 and fixed station 220 are associated with the same telephone number, and that user device 210 and fixed station 220 are located substantially remote from each other. Further, assume that an established call session currently exists between user device 210 and a device at a terminating end (e.g., a mobile phone, a landline phone, a VoIP device, etc.). Further, assume that user device 210 places the call on hold (arrow 7.1). Given these assumptions, call session management server 230 may update the line status (e.g., the status of a line hosting the call), to "hold, locked."

Call session management server 230 may output the line status to fixed station 220 (arrow 7.3). In some implementations, fixed station 220 may display the line status as shown. Assume that after the line status has been updated, a user of fixed station 220 attempts to access the line by selecting a bottom or command on fixed station 220 used to request access to the line. Given this assumption, fixed station 220 may request a call session for the call hosted by the line (arrow 7.4). Since the line status is "locked," call session management server 230 may prevent access to the line by not establishing the requested call session (arrow 7.5). As a result, the user of fixed station 220 may not access the call when user device 210 and fixed station 220 are located substantially remote from each other.

Figure 8:
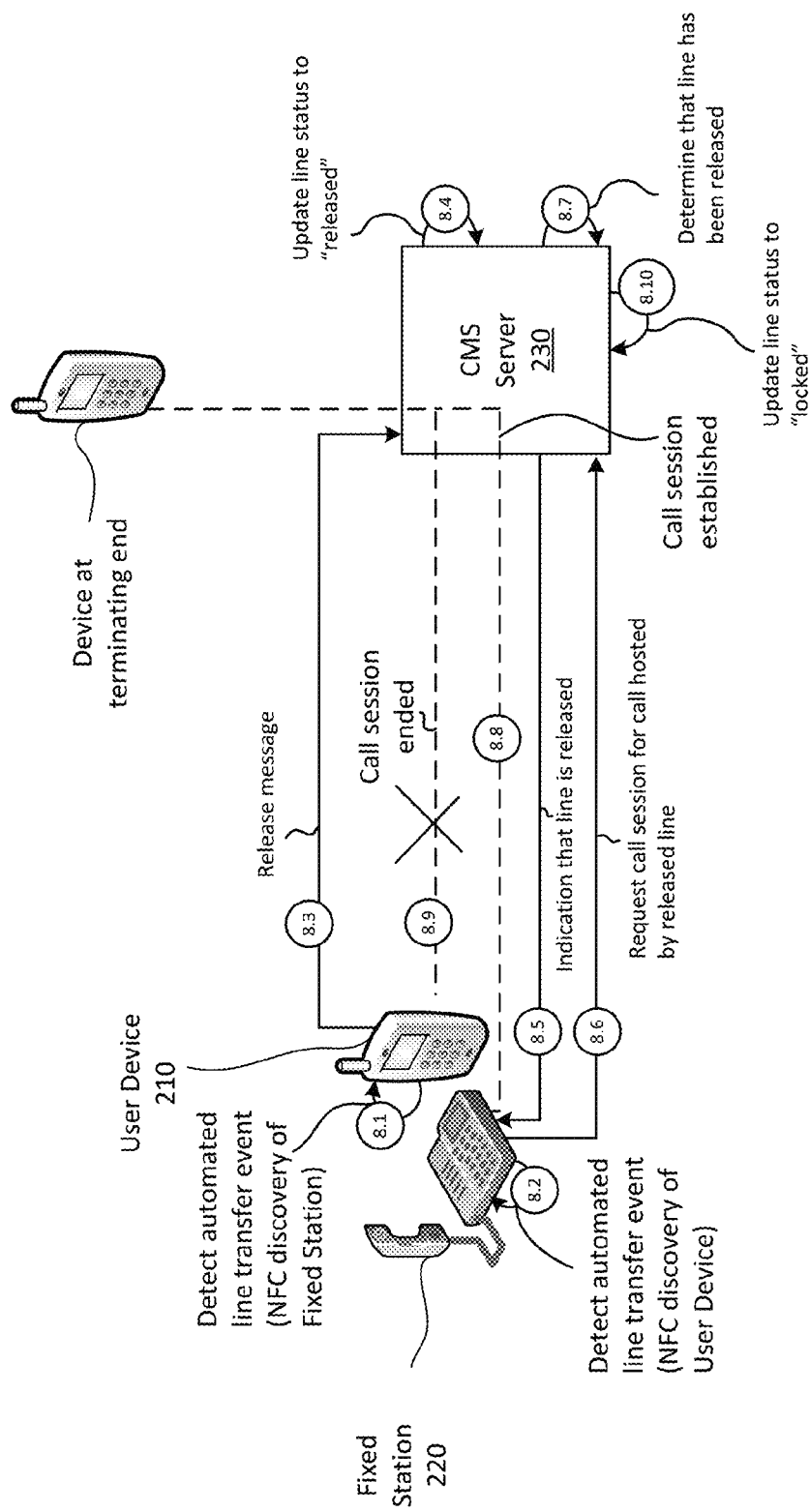
FIG. 8 illustrates an example implementation for transferring control of a line when a user device and fixed station discover each other via NFC.

FIG. 8 illustrates an example implementation for transferring control of a line when a user device and fixed station discover each other via NFC. In FIG. 8, assume that user device 210 and fixed station 220 are associated with the same telephone number, and that an existing call session exists been user device 210 and a device at a terminating end. Further, assume that user device 210 and fixed station 220 are placed with NFC range of each other. Further, assume that user device 210 and fixed station 220 have been set up to detect automated call transfer events when user device 210 and fixed station 220 discover each other via NFC (e.g., when user device 210 receives an NDEF message containing an identifier of fixed station 220, and when fixed station 220 receives an NDEF message containing an identifier of user device 210). Given these assumptions, user device 210 and fixed station 220 may discover each other via NFC, and may each detect an automated line transfer event (arrows 8.1 and 8.2).

Based on detecting the automated line transfer event, user device 210 may output a release message to call session management server 230 (arrow 8.3), and call session management server 230 may update the line status to "released" (arrow 8.4). Call session management server 230 may output, to fixed station 220, a line status update indicating that the line has been released (arrow 8.5). Fixed station 220 may request a call session for the call hosted by the released line (arrow 8.6), and call session management server 230 may determine that the line has been released (arrow 8.7). Call session management server 230 may then established a call session between fixed station 220 and the device at the terminating end (arrow 8.8). Call session management server 230 may further end the call session between user device 210 and the device at the terminating end (arrow 8.9). Call session management server 230 may also update the line status to "locked" (arrow 8.10) to prevent other devices from accessing the line.

In some implementations, arrows 8.3 to 8.10 may occur within seconds of user device 210 and fixed station 220 detecting the line transfer event. As a result, calls may be transferred from user device 210 to fixed station 220 relatively quickly, simply by tapping user device 210 to fixed station 220. Also, calls may be transferred from fixed station 220 to user device 210.

While the transfer of control of a single line is shown in FIG. 8, in practice, the control of multiple lines may be transferred in a similar manner. For example, at arrow 8.3, user device 210 may send a release message to release control of multiple lines. Call session management server 230 may then update the line status for the multiple lines to "released" (arrow 8.4), and indicate that the multiple lines have been released (arrow 8.5). Fixed station 220 may then request call sessions for calls hosted by the respective multiple lines (arrow 8.6), and call session management server 230 may then determine that the multiple lines have been released (arrow 8.7). Call session management server 230 may establish call sessions between fixed station 220 and respective terminating ends of the multiple lines (arrow 8.8), and end the call sessions between user device 210 and the respective terminating ends (arrow 8.9). Call session management server 230 may then update the line statuses for the multiple lines to "locked" (arrow 8.10).

Figure 9A:
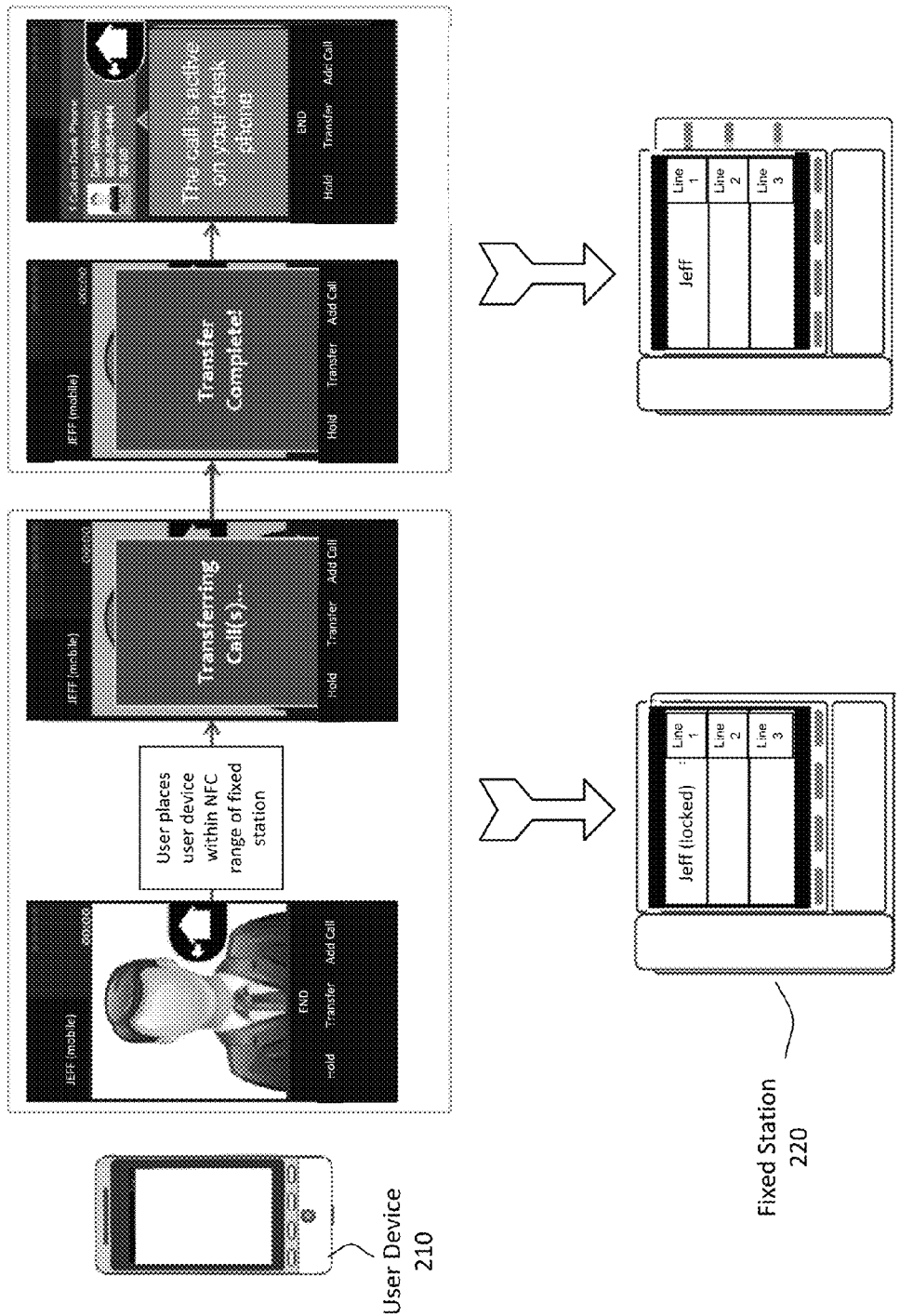
FIGS. 9A and 9B illustrate example user interfaces that correspond to the transferring control of lines from a user device to a fixed station.
Figure 9B:
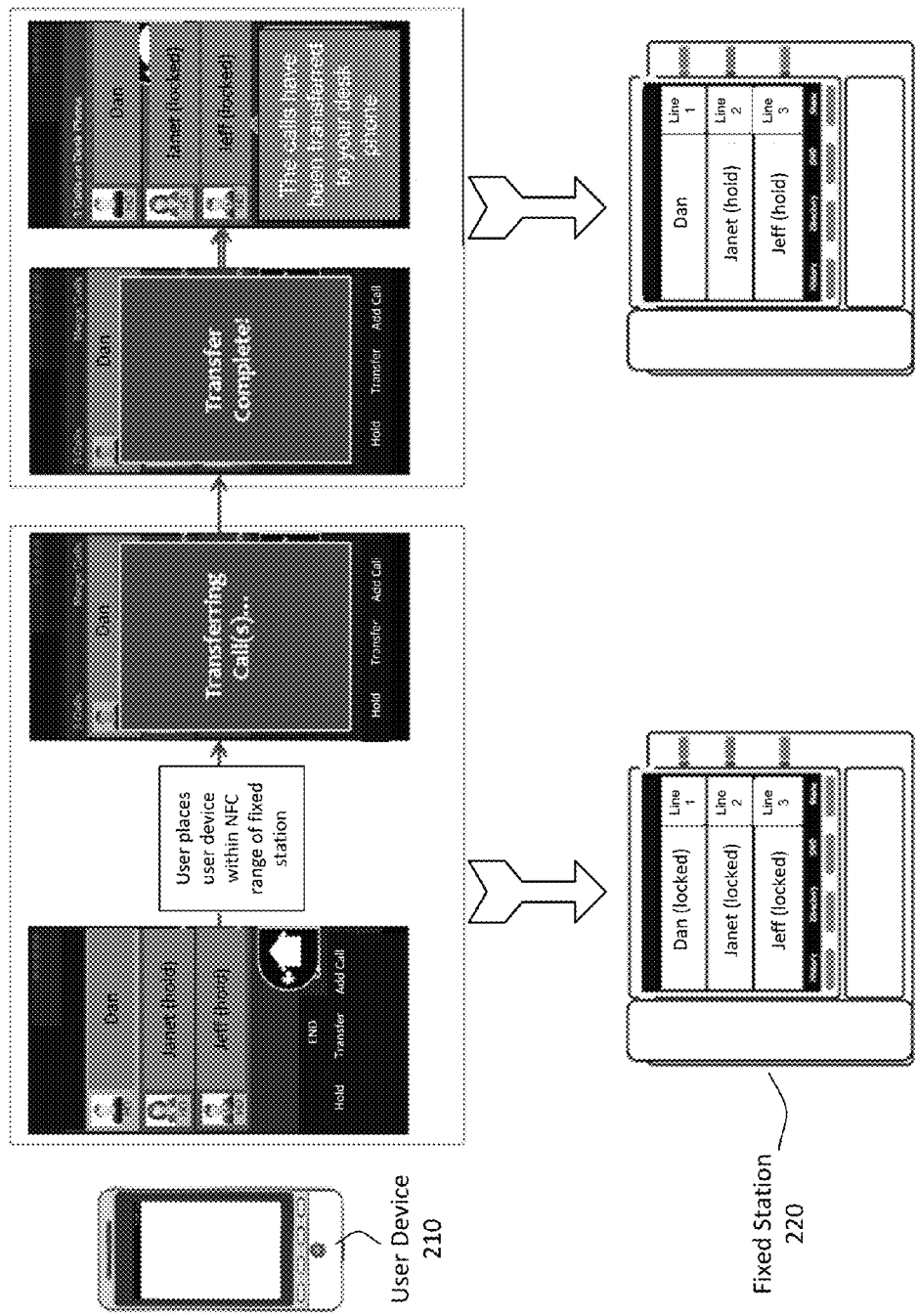

FIGS. 9A and 9B illustrate example implementations for transferring control of lines from a user device to a fixed station. As shown in FIG. 9A, a single call may be active on user device 210, and, thus, may be locked on fixed station 220. Fixed station 220 may receive line status from call session management server 230, and display the line status. For example, fixed station 220 may display the line status of "locked" since the line is locked to user device 210. Also, since the line status may include a telephone number of party at the terminating end of the call, fixed station 220 may display a name of an individual corresponding to the telephone number (e.g., when fixed station 220 stores the name of the individual corresponding to the telephone number in an address book of fixed station 220). In some implementations, fixed station 220 may display a particular icon or color (e.g., red), indicating that the line is locked and unavailable to fixed station 220.

As further shown in FIG. 9A, user device 210 may indicate that the call is being transferred to fixed station 220 (e.g., control of the line hosting the call) when the user of user device 210 places user device 210 within NFC range of fixed station 220. For example, user device 210 may release control of the line (e.g., by outputting a release message to call session management server 230), and fixed station 220 may take control of the line (e.g., by requesting a call session for the call). In some implementations, the call session may be established for fixed station 220 without fixed station 220 needing to request the call session. After fixed station 220 has taken control of the line, user device 210 may display a message indicating that transfer of the call has been completed. User device 210 may further display a message directing the user to continue the call on the fixed station. Also, fixed station 220 may display a particular icon or color (e.g., green), indicating that the line is available to fixed station 220.

Referring to FIG. 9B, multiple lines hosting respective calls may be controlled by user device 210, and thus may be locked to user device 210. For example, one of the calls may be active, and the other two may be on hold. Fixed station 220 may indicate that the lines (including the lines hosting calls on hold) are locked and unavailable to fixed station 220. When user device 210 is placed within NFC range of fixed station 220, user device 210 may release control of the lines, and indicate that the calls, hosted by the lines, are being transferred. Fixed station 220 may take control of the lines, and user device 210 may display an indication that the transfer of the calls has been completed. User device 210 may also display a message directing the user to continue the calls on the fixed station. Additionally, or alternatively, user device 210 may play an audio message and/or provide haptic feedback indicating that the call has been transferred.

As described above, unauthorized users may be unable to access a call since control of a line hosting the call may only be transferred when user device 210 and fixed station 220 are within close proximity of each other (e.g., within NFC communications range). Furthermore, calls may be quickly and conveniently transferred (e.g., by transferring control of lines hosting the calls) simply by placing user device 210 within NFC communications range of fixed station 220 (e.g., tapping user device 210 to fixed station 220). As an example, if a user was on a call using a mobile phone (e.g., user device 210), the user may quickly transfer the call to his or her desk phone (e.g., fixed station 220) when the user arrives at their home or office in which the desk phone is located. Similarly, if the user is on a call on their desk phone, the user may quickly transfer the call to his or her mobile phone to continue the call when the user leaves the location of his or her desk phone.

Figure 10:
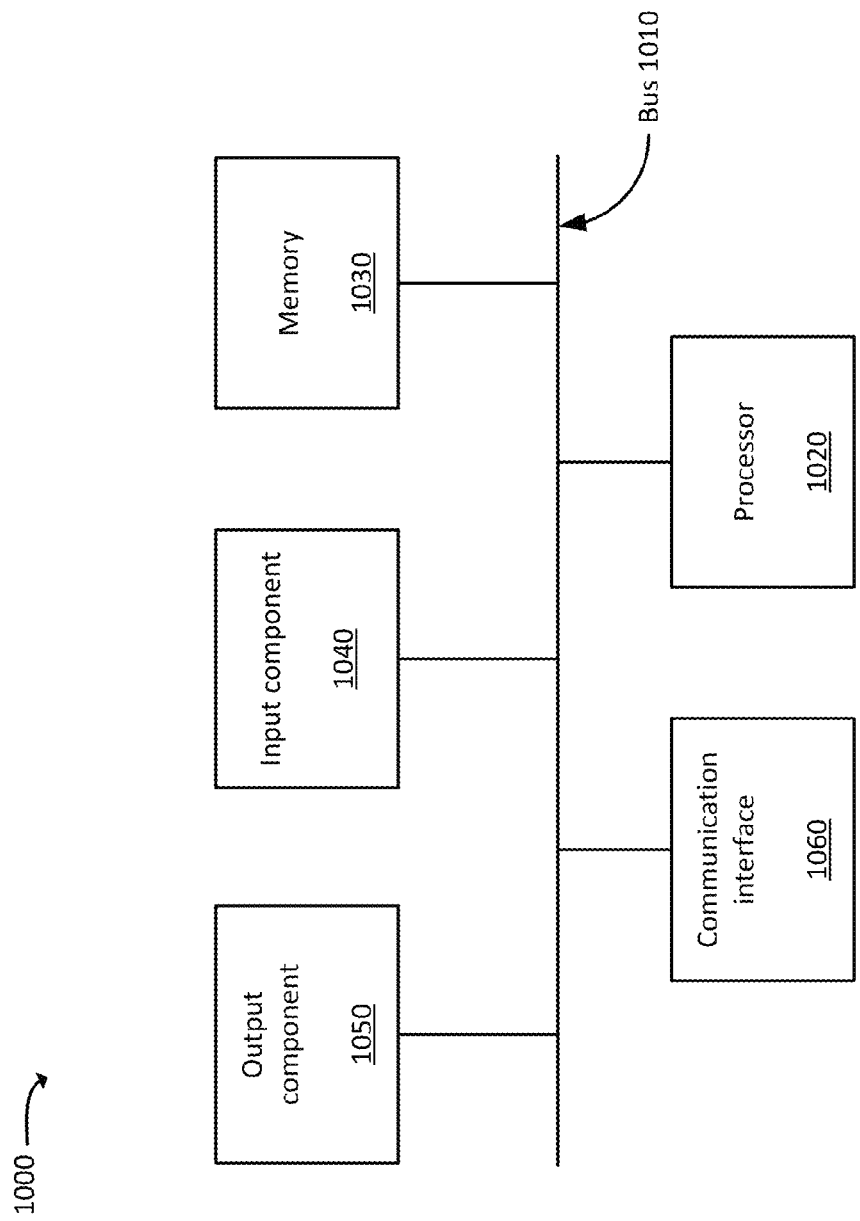
FIG. 10 illustrates example components of one or more devices, according to one or more implementations described herein.

FIG. 10 is a diagram of example components of device 1000. One or more of the devices described above (e.g., with respect to FIGS. 1A, 1B, 2, 3, 7, 8, 9A, and 9B) may include one or more devices 1000. Device 1000 may include bus 1010, processor 1020, memory 1030, input component 1040, output component 1050, and communication interface 1060. In another implementation, device 1000 may include additional, fewer, different, or differently arranged components.

Bus 1010 may include one or more communication paths that permit communication among the components of device 1000. Processor 1020 may include a processor, microprocessor, or processing logic that may interpret and execute instructions. Memory 1030 may include any type of dynamic storage device that may store information and instructions for execution by processor 1020, and/or any type of non-volatile storage device that may store information for use by processor 1020.

Input component 1040 may include a mechanism that permits an operator to input information to device 1000, such as a keyboard, a keypad, a button, a switch, etc. Output component 1050 may include a mechanism that outputs information to the operator, such as a display, a speaker, one or more light emitting diodes ("LEDs"), etc.

Communication interface 1060 may include any transceiver-like mechanism that enables device 1000 to communicate with other devices and/or systems. For example, communication interface 1060 may include an Ethernet interface, an optical interface, a coaxial interface, or the like. Communication interface 1060 may include a wireless communication device, such as a cellular radio transceiver, infrared ("IR") receiver, a Bluetooth® radio (Bluetooth is a registered trademark of Bluetooth SIG, Inc.), radio, or the like. The wireless communication device may be coupled to an external device, such as a remote control, a wireless keyboard, a mobile telephone, etc. In some embodiments, device 1000 may include more than one communication interface 1060. For instance, device 1000 may include an optical interface and an Ethernet interface.

Device 1000 may perform certain operations relating to one or more processes described above. Device 1000 may perform these operations in response to processor 1020 executing software instructions stored in a computer-readable medium, such as memory 1030. A computer-readable medium may be defined as a non-transitory memory device. A memory device may include space within a single physical memory device or spread across multiple physical memory devices. The software instructions may be read into memory 1030 from another computer-readable medium or from another device. The software instructions stored in memory 1030 may cause processor 1020 to perform processes described herein. Alternatively, hardwired circuitry may be used in place of or in combination with software instructions to implement processes described herein. Thus, implementations described herein are not limited to any specific combination of hardware circuitry and software.

The foregoing description of implementations provides illustration and description, but is not intended to be exhaustive or to limit the possible implementations to the precise form disclosed. Modifications and variations are possible in light of the above disclosure or may be acquired from practice of the implementations. For example, while series of blocks have been described with regard to FIGS. 4-6, the order of the blocks may be modified in other implementations. Further, non-dependent blocks may be performed in parallel.

As another example, while described in the context of calls being transferred between a user device 210 and a fixed station 220, in some implementations, similar techniques may be used to transfer calls between a first user device 210 and a second user device 210; between a first fixed station 220, and a second fixed station 220; and/or another type of device. Also, other communication protocols and/or techniques, in addition to or instead of NFC, may be used, such as Bluetooth Low Energy ("BLE"), ZigBee, WiFi, etc. Additionally, or alternatively, location based techniques (e.g., using Global Positioning Systems ("GPS")) can be used to determine that two devices are within close proximity of each other (e.g., within the same building).

It will be apparent that different examples of the description provided above may be implemented in many different forms of software, firmware, and hardware in the implementations illustrated in the figures. The actual software code or specialized control hardware used to implement these examples is not limiting of the implementations. Thus, the operation and behavior of these examples were described without reference to the specific software code—it being understood that software and control hardware may be designed to implement these examples based on the description herein.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

Further, while certain connections or devices are shown (e.g., in FIGS. 2, 7, and 8), in practice, additional, fewer, or different, connections or devices may be used. Furthermore, while various devices and networks are shown separately, in practice, the functionality of multiple devices may be performed by a single device, or the functionality of one device may be performed by multiple devices. Further, multiple ones of the illustrated networks may be included in a single network, or a particular network may include multiple networks. Further, while some devices are shown as communicating with a network, some such devices may be incorporated, in whole or in part, as a part of the network.

To the extent the aforementioned implementations collect, store, or employ personal information provided by individuals, it should be understood that such information shall be used in accordance with all applicable laws concerning protection of personal information. Additionally, the collection, storage, and use of such information may be subject to consent of the individual to such activity, for example, through "opt-in" or "opt-out" processes as may be appropriate for the situation and type of information. Storage and use of personal information may be in an appropriately secure manner reflective of the type of information, for example, through various encryption and anonymization techniques for particularly sensitive information.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

What is claimed is:

1. A first device comprising:
   a non-transitory memory device storing a plurality of processor-executable instructions; and
   a processor configured to execute the processor-executable instructions, wherein executing the processor-executable instructions causes the first device to:
   detect a presence of a second device;
   begin a countdown based on detecting the presence of the second device;
   determine, based on detecting the presence of the second device, whether the first device is engaged in an ongoing telephone call; and
   transfer, based on determining that the first device is engaged in the ongoing telephone call and after an expiration of the countdown, the ongoing telephone call from the first device to the second device, the transferring including outputting a line release message that facilitates the transfer of the ongoing telephone call to the second device.

2. The first device of claim 1, wherein the detection of the second device is performed using Near-Field Communications.

3. The first device of claim 1, wherein the first device controls the line before outputting the line release message, and wherein the ongoing telephone call is not able to be transferred before the first device outputs the line release message.

4. The first device of claim 1, wherein executing the processor-executable instructions further causes the first device to display an indication that the ongoing telephone call is being transferred.

5. The device of claim 1, wherein the ongoing telephone call is hosted by a particular line, and
   wherein executing the processor-executable instructions, to output the line release message, includes outputting the line release message to a third device, the line release message causing the third device to provide a status of the particular line to the second device, to indicate that the particular line has been released and is available to be controlled by the second device.

6. The first device of claim 1, wherein executing the processor-executable instructions, to output the line release message, causes a call session, associated with the first device, to be ended,
   the call session corresponding to the ongoing telephone call.

7. The first device of claim 1, wherein the first device is a fixed station.

8. A method comprising:
   detecting, by a first device, a presence of a second device;
   beginning a countdown based on detecting the presence of the second device;
   determining, by the first device, based on an expiration of the countdown, and further based on detecting the presence of a second device, whether the first device controls a line hosting an ongoing telephone call;
   receiving, by the first device, based on determining that the first device does not control the line, a line status update,
   the line status update indicating that the line has been released by a second device that controlled the line prior to releasing the line,
   the line having been released by the second device based on the detecting of the second device by the first device; and
   establishing, by the first device, a call session for the ongoing telephone call hosted by the line.

9. The method of claim 8, wherein the second device is detected via Near-Field Communications.

10. The method of claim 8, wherein the ongoing telephone call is not able to be transferred while the second device controls the line and before the second device releases the line.

11. The method of claim 8, further comprising:
    displaying an indication that the ongoing telephone call is being transferred based on detecting the presence of the second device.

12. The method of claim 8, wherein receiving the line status updates includes receiving the line status update from a third device, the third device outputting the line status update based on receiving a line release message from the second device indicating indicate that the line has been released and is available to be controlled by the first device.

13. The method of claim 8, wherein establishing the call session is based on a third device receiving a line release message from the second device.

14. The method of claim 8, wherein the first device is a user device or a fixed station.

15. A server device comprising:
a non-transitory memory device storing a plurality of processor-executable instructions; and
a processor configured to execute the processor-executable instructions, wherein executing the processor-executable instructions causes the server device to:
receive information that a call session, associated with a first device, has been established;
store, based on receiving the information that the call session has been established, line status information identifying that a line, associated with the call session, is inaccessible to devices other than the first device;
receive, from a second device, a request to access the line while the established call session is ongoing;
determine, based on receiving the request from the second device, whether the first device is within a particular proximity of the second device;
when it is determined that the first device is not within the particular proximity of the second device:
determine that access to the line by the second device, while the established call session is ongoing, is not permitted, and
deny the request, received from the second device, based on determining that access to the line by the second device is not permitted; and
when it is determined that the first device is within the particular proximity of the second device:
determine that access to the line by the second device, while the established call session is ongoing, is permitted, and
grant the request, received from the second device, based on determining that access to the line by the second device is permitted, wherein the granting includes transferring the ongoing call session from the first device to the second device.

16. The server device of claim 15, wherein executing the processor-executable instructions further causes the server device to:
receive, from the first device and after storing the line status information, a release message;
update, based on receiving the release message, the line status information to identify that the line and the telephone call are no longer locked to the first device and are accessible to other devices;
subsequently determine that access to the line by the second device is permitted based on updating the line status information;
permit a call session, for the second device, to be established, based on determining that access to the line by the second device is permitted; and
update, based the call session for the second device being established, information identifying that the line is inaccessible to devices other than the second device.

17. The server device of claim 15, wherein the determination of whether the first device is within a particular proximity of the second device is based on a detection, of the second device, by the first device using Near-Field Communications.

18. The server device of claim 15, wherein the first device is a user device or a fixed station.

* * * * *